(12) United States Patent
Van der Merwe et al.

(10) Patent No.: US 10,079,760 B2
(45) Date of Patent: Sep. 18, 2018

(54) PROXIMITY ROUTING FOR SESSION BASED APPLICATIONS USING ANYCAST

(71) Applicant: AT&T INTELLECTUAL PROPERTY II, L.P., Atlanta, GA (US)

(72) Inventors: Jacobus Van der Merwe, Salt Lake City, UT (US); Oliver Spatscheck, Randolph, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 291 days.

(21) Appl. No.: 14/480,734

(22) Filed: Sep. 9, 2014

(65) Prior Publication Data

US 2014/0379863 A1    Dec. 25, 2014

Related U.S. Application Data

(63) Continuation of application No. 11/924,919, filed on Oct. 26, 2007, now Pat. No. 8,838,802.

(51) Int. Cl.
| | |
|---|---|
| *H04L 12/741* | (2013.01) |
| *H04L 29/12* | (2006.01) |
| *H04L 12/701* | (2013.01) |
| *H04L 12/707* | (2013.01) |
| *H04L 29/08* | (2006.01) |

(52) U.S. Cl.
CPC ........ *H04L 45/74* (2013.01); *H04L 29/12066* (2013.01); *H04L 29/12349* (2013.01); *H04L 45/00* (2013.01); *H04L 45/22* (2013.01); *H04L 61/1511* (2013.01); *H04L 61/2007* (2013.01); *H04L 61/2507* (2013.01); *H04L 67/10* (2013.01); *H04L 67/1002* (2013.01); *H04L 67/1027* (2013.01)

(58) Field of Classification Search
CPC ....................................................... H04L 45/74
USPC ......................................................... 709/217
See application file for complete search history.

(56) References Cited

U.S. PATENT DOCUMENTS

| | | | | |
|---|---|---|---|---|
| 6,513,061 | B1 * | 1/2003 | Ebata ...................... | H04L 29/06 709/201 |
| 6,901,445 | B2 | 5/2005 | McCanne et al. | |
| 7,116,682 | B1 * | 10/2006 | Waclawsky ........... | H04J 3/1682 370/468 |
| 7,395,351 | B1 * | 7/2008 | Nucci ................. | H04L 41/0654 370/238 |
| 2002/0016860 | A1 | 2/2002 | Garcia-Luna-Aceves | |
| 2003/0051016 | A1 * | 3/2003 | Miyoshi ................. | H04L 29/06 709/222 |

(Continued)

OTHER PUBLICATIONS

Cisco Systems, "Hot Standby Router Protocol Features and Functionality," May 25, 2006.*

(Continued)

*Primary Examiner* — Andrew Georgandellis
(74) *Attorney, Agent, or Firm* — Akerman LLP; Michael K. Dixon; Mammen (Roy) P. Zachariah, Jr.

(57) ABSTRACT

Certain exemplary embodiments can comprise a method, which can comprise automatically providing content to an information device from a content distribution node of a plurality of content distribution nodes. The information device can be adapted to send a request for the content from the first content distribution node utilizing an Internet Protocol (IP) address of the content distribution node.

20 Claims, 9 Drawing Sheets

(56) References Cited

U.S. PATENT DOCUMENTS

| | | |
|---|---|---|
| 2003/0079027 A1 | 4/2003 | Slocombe |
| 2003/0105865 A1* | 6/2003 | McCanne ............... H04L 12/18 709/225 |
| 2004/0063402 A1 | 4/2004 | Takeda |
| 2004/0107234 A1 | 6/2004 | Rajahalme |
| 2004/0143662 A1 | 7/2004 | Poyhonen |
| 2005/0198381 A1* | 9/2005 | Rorie .................. H04L 12/4641 709/239 |

OTHER PUBLICATIONS

Network Working Group, "Request for Comments: 3768—Virtual Router Redundancy Protocol (VRRP)," Apr. 2004.*

* cited by examiner

PROXIMITY ROUTING FOR SESSION BASED APPLICATIONS USING ANYCAST

CROSS REFERENCE TO RELATED APPLICATIONS

This application is a continuation of U.S. patent application Ser. No. 11/924,919 filed on Oct. 26, 2007, the disclosure of which is hereby incorporated by reference in its entirety.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Figure 1:
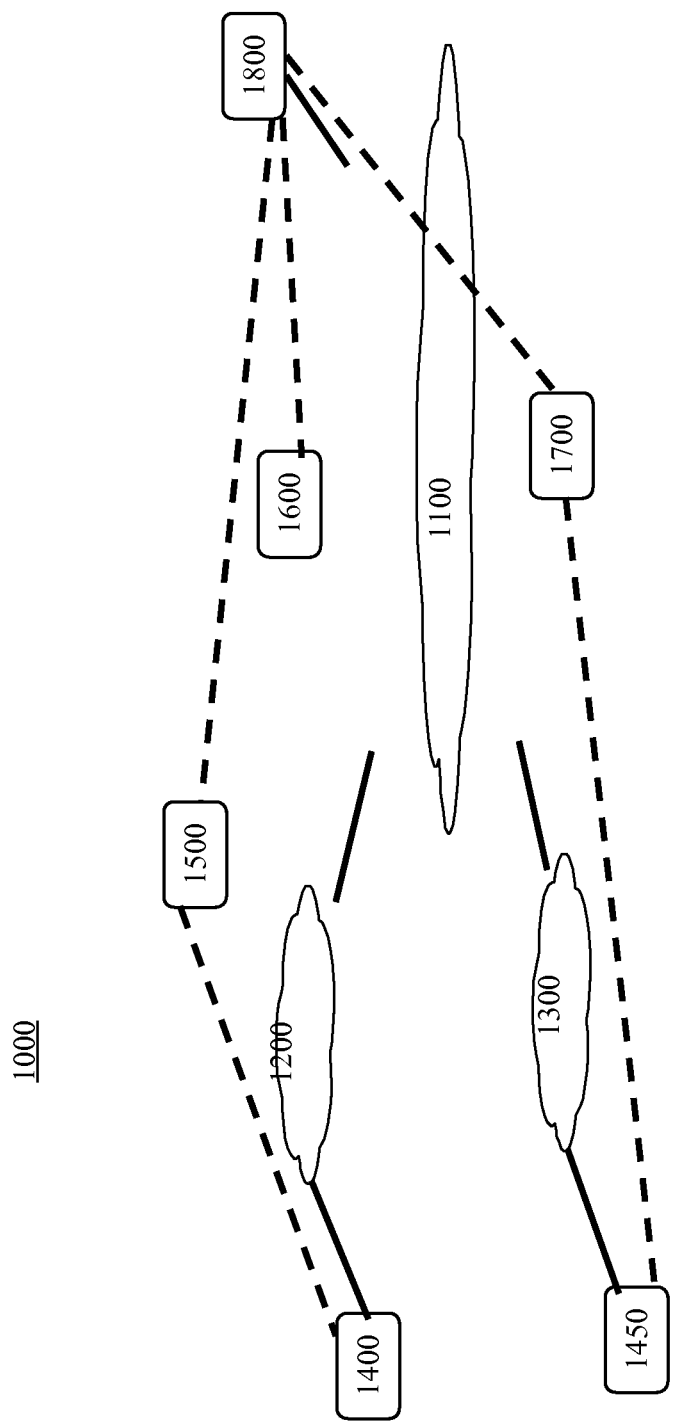
FIG. 1 is a block diagram of an exemplary embodiment of a system 1000.

Certain exemplary embodiments provide a method, which can comprise automatically providing content to an information device from a content distribution node of a plurality of content distribution nodes. The information device can be adapted to send a request for the content from the first content distribution node utilizing an Internet Protocol (IP) address of the content distribution node.

Content distribution networks (CDNs) can be an important resource in public networks. As used herein, resource means something used for support or help. As used herein, can means is capable of, in at least some embodiments. CDNs can be used in applications ranging from broadcasted events to the distribution of on-line media. As used herein, used means employed for a purpose. As used herein, from means used to indicate a source. Building an effective CDN in a diverse enterprise network can be a challenge. As used herein, a means at least one. As used herein, one means a single entity. As used herein, at least means not less than. As used herein, plurality means the state of being plural and/or more than one.

As used herein, network means a communicatively coupled plurality of nodes, communication devices, and/or information devices. Via a network, such devices can be linked, such as via various wireline and/or wireless media, such as cables, telephone lines, power lines, optical fibers, radio waves, and/or light beams, etc., to share resources (such as printers and/or memory devices), exchange files, and/or allow electronic communications there between. A network can be and/or can utilize any of a wide variety of sub-networks and/or protocols, such as a circuit switched, public-switched, packet switched, connection-less, wireless, virtual, radio, data, telephone, twisted pair, POTS, non-POTS, DSL, cellular, telecommunications, video distribution, cable, terrestrial, microwave, broadcast, satellite, broadband, corporate, global, national, regional, wide area, backbone, packet-switched TCP/IP, IEEE 802.03, Ethernet, Fast Ethernet, Token Ring, local area, wide area, IP, public Internet, intranet, private, ATM, Ultra Wide Band (UWB), Wi-Fi, BlueTooth, Airport, IEEE 802.11, IEEE 802.11a, IEEE 802.11b, IEEE 802.11g, X-10, electrical power, multi-domain, and/or multi-zone subnetwork and/or protocol, one or more Internet service providers, and/or one or more information devices, such as a switch, router, and/or gateway not directly connected to a local area network, etc., and/or any equivalents thereof.

As used herein, non means not. As used herein, via means by way of and/or utilizing. As used herein, utilize means to use and/or put into service. As used herein, not means a negation of something. As used herein, router means a device adapted to direct traffic and/or determine the next network point to which a data packet should be forwarded enroute toward its destination. The router is connected to at least two networks and determines which way to send each data packet based on its current understanding of the state of the networks it is connected to. Routers create or maintain a table of the available routes and use this information to determine the best route for a given data packet. A typical router operates at least at the bottom 3 layers (Physical, Link, and Network layers) of the OSI model. As used herein, send means to convey. As used herein, server means an information device and/or a process running thereon that is adapted to be communicatively coupled to a network and that is adapted to provide at least one service for at least one other information device communicatively coupled to the network and/or for at least one process running on the other information device. A common example is a file server, which has a local disk and services requests from remote clients to read and write files on that disk. A server can also provide access to resources, such as programs, shared devices, etc.

As used herein, network interface means any physical and/or logical device, system, and/or process capable of coupling an information device to a network. Exemplary network interfaces comprise a telephone, cellular phone, cellular modem, telephone data modem, fax modem, wireless transceiver, Ethernet card, cable modem, digital subscriber line interface, bridge, hub, router, or other similar device, software to manage such a device, and/or software to provide a function of such a device. As used herein, process means (n.) an organized series of actions, changes, and/or functions adapted to bring about a result. (v.) to perform mathematical and/or logical operations according to programmed instructions in order to obtain desired information and/or to perform actions, changes, and/or functions adapted to bring about a result. As used herein, other means not the same as already mentioned and/or implied. As used herein, provide means to furnish, supply, give, convey, send, and/or make available.

Streaming media transmissions can be utilized for both live Webcasts and on-demand access to streaming content. As used herein, transmission means an electronic communication of a message. As used herein, access means (n.) a permission, liberty, right, mechanism, or ability to enter, approach, communicate with and/or through, make use of, and/or pass to and/or from a place, thing, and/or person. (v)

to enter, approach, communicate with and/or through, make use of, and/or pass to and/or from. As used herein, make means to create, generate, and/or form. As used herein, and/or means either in conjunction with or in alternative to. As used herein, communicate means to exchange information. As used herein, content means substance and/or substantive portion of a packet. As used herein, packet means a generic term for a bundle of data organized in a specific way for transmission, such as within and/or across a network, such as a digital packet-switching network, and comprising the data to be transmitted and certain control information, such as a destination address. As used herein, transmit means to provide, furnish, supply, send as a signal, and/or to convey (e.g., force, energy, and/or information) from one place and/or thing to another. As used herein, either means one or the other of two. Such transmissions can be made in corporate environments where streaming can be used for employee town-hall meetings and/or training courses, etc. As used herein, enter means to come and/or flow into. As used herein, for means with a purpose of.

Certain exemplary embodiments can be adapted to provide and/or define paths for content, such as streaming content, via a backbone network. As used herein, define means to establish the meaning, relationship, outline, form, and/or structure of; and/or to precisely and/or distinctly describe and/or specify. The content can be associated with a content server and can be distributed to requesting end nodes via a plurality of content distribution nodes. As used herein, content distribution node means an information device communicatively coupled to a network, the information device addressable via a domain name portion of a Uniform Resource Locator associated with a content provider, and adapted to obtain and store, and transmit upon request, information obtained from the content provider. The content can be routed intelligently by utilizing traffic information that is obtained and/or analyzed by an Intelligent Route Service Control Point (IRSCP). As used herein, Intelligent Route Service Control Point (IRSCP) means a device adapted to provide a preferred route for a predetermined block of traffic to a router. As used herein, predetermined means established in advance. The IRSCP can be adapted to automatically detect traffic loads in a network communicatively coupled to an information device. As used herein, traffic load means an intensity of a flow of bits, packets, datagrams, calls, and/or messages. The IRSCP can be adapted to dynamically change preferred routes provided to a plurality of Provider Edge (PE) routers responsive to the traffic loads. As used herein, responsive means reacting to an influence and/or impetus. The IRSCP can be adapted to cause a redirection of traffic responsive to changes in load conditions and/or detected failures in a network. Thus, the IRSCP can be adapted to provide network load balancing. As used herein, cause, when used as a verb, means to bring about, provoke, precipitate, produce, elicit, be the reason for, result in, and/or effect.

FIG. 1 is a block diagram of an exemplary embodiment of a system 1000, which can comprise a backbone network 1100, a first access network 1200, a second access network 1300, a first information device 1400, a second information device 1450, a content provider 1800, a first content distribution node 1500, a second content distribution node 1600, and a third content distribution node 1700. Note, heavy solid lines represent physical and/or logical communications links and light lines with arrow tips represent an exchange of information between connected entities. As used herein, content provider means an information device that comprises predetermined substantive information and is adapted to provide the predetermined substantive information to a plurality of content distribution nodes for further distribution to requesting information devices. As used herein, further means in addition. As used herein, third means an element that immediately follows a second element of a series. Content from content distribution node 1500 can be provided to information devices such as first information device 1400 and second information device 1450 via a selected one of first content distribution node 1500, second content distribution node 1600, and third content distribution node 1700. As used herein, selected means a chosen item. Utilizing content distribution nodes to provide content can improve performance and/or network link loads compared to providing content directly to first information device 1400 and second information device 1450 from content provider 1800. Selection of one of first content distribution node 1500, second content distribution node 1600, and third content distribution node 1700 to provide content to first information device 1400 and/or second information device 1450 can be made to provide a best found content transfer logical distance and/or rate within constraints of avoiding overloading network links and/or nodes. In certain exemplary embodiments, selection of one of first content distribution node 1500, second content distribution node 1600, and third content distribution node 1700 to provide content to first information device 1400 and/or second information device 1450 can be dynamic in that different selections might be made over time responsive to network load conditions and/or network failures.

Figure 2:
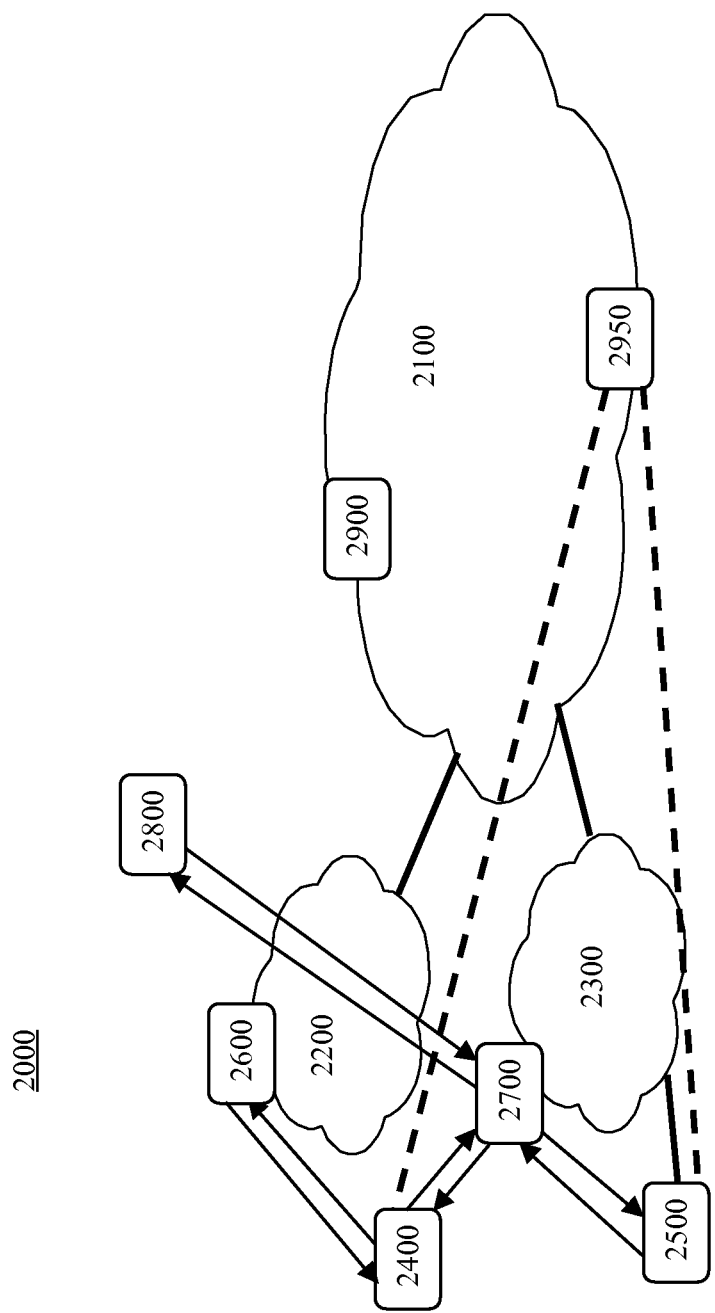
FIG. 2 is a block diagram of an exemplary embodiment of a system 2000.

FIG. 2 is a block diagram of an exemplary embodiment of a system 2000, which can comprise a backbone network 2100, a first access network 2200, a second access network 2300, a first information device 2400, a second information device 2500, a first local DNS 2600, a second local DNS 2700, a DNS based redirection system 2800, a first content distribution node 2900, and a second content distribution node 2950. Note, heavy solid lines represent physical and/or logical communications links and light lines with arrow tips represent an exchange of information between connected entities. Redirection of selections of first content distribution node 2900 and second content distribution node 2950 can be made via intercepting DNS resolution requests. For example, first information device 2400 can request an address via which content can be obtained. The request can be made to second local DNS 2700. Responsive to the request, second local DNS 2700 can request address information from DNS based redirection system 2800, which can provide the address information to second local DNS 2700. DNS based redirection system 2800 can determine the address information based upon an automatic determination of which of first content distribution node 2900 and second content distribution node 2950 should be selected to provide the content to first information device 2400. The address returned by first information device 2400 from DNS based redirection system 2800 via second local DNS 2700 can be an Internet Protocol (IP) address. In certain exemplary embodiments, the IP address can be an anycast IP address associated with each of first content distribution node 2900 and second content distribution node 2950. As used herein, anycast Internet Protocol (IP) address means an address that can be shared among a plurality of information devices adapted to provide predetermined content, via a network utilizing the Internet Protocol standard, to a requesting information device, a Provider Edge device selects an information device of the plurality of information devices to provide the predetermined content to the requesting information device, the requesting information device is not necessarily provided with a unique identifier of the selected information device. As used herein, unique means not identical to any other. The anycast IP address might not uniquely identify first content distribution node 2900 and second content distribution node 2950.

DNS based redirection system 2800 can be directly coupled to backbone network 2100. DNS based redirection system 2800 can be adapted to provide an anycast IP address to a DNS server (e.g., first local DNS 2600 and/or second local DNS 2700) responsive to a domain name portion of a Uniform Resource Locator (URL) received by the DNS server from first information device 2400. The domain name portion of the URL can be indicative of a request by first information device 2400 for content. As used herein, indicative means serving to indicate. The anycast IP address can be assigned to a plurality of content distribution nodes. Each of the plurality of content distribution nodes can be assigned a unique unicast IP address. As used herein, unicast Internet Protocol (IP) address means a unique address assigned to a specific information device such that other information devices can identify and communicate with and/or through that specific information device via a network utilizing the Internet Protocol standard (IP). Each of the plurality of content distribution nodes addressable by the anycast IP address or the unique unicast IP address. As used herein, addressable means capable of being addressed and/or communicated with.

Figure 3:
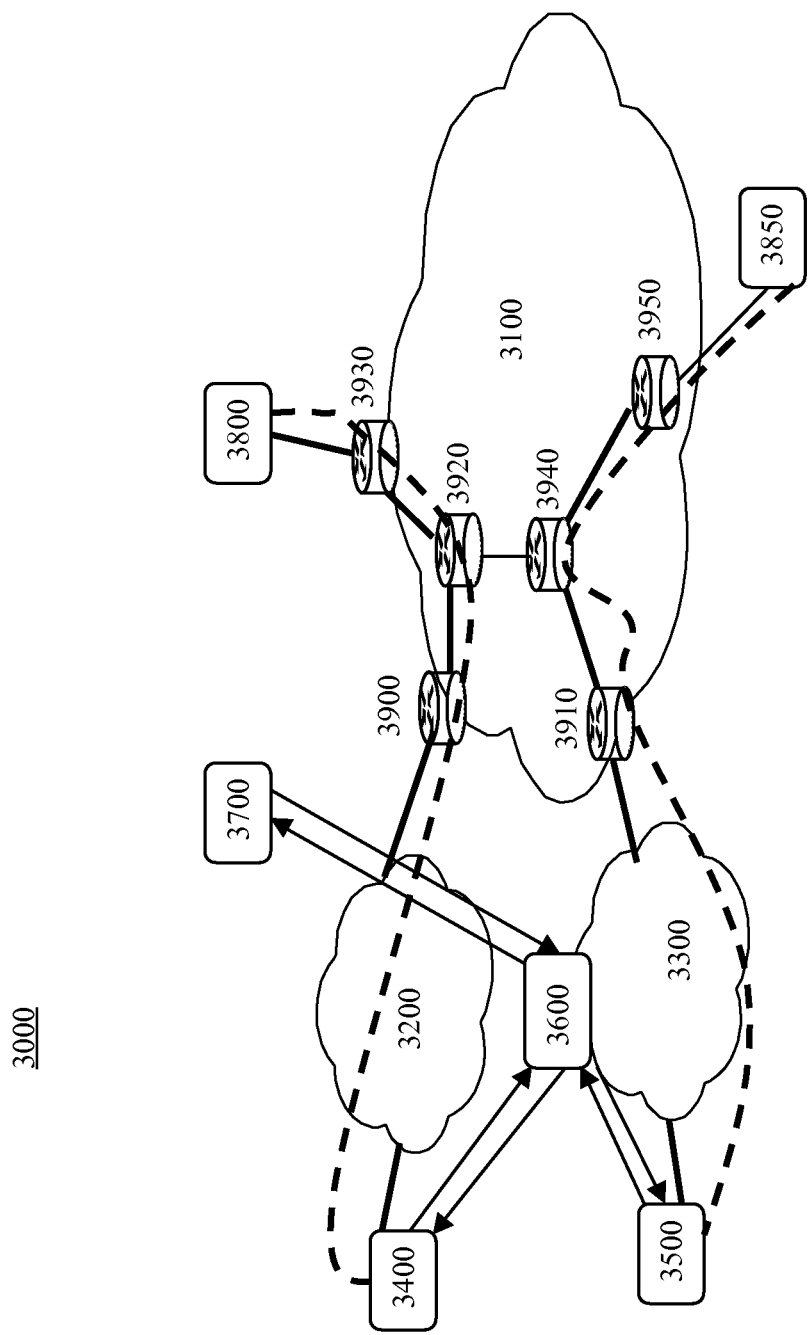
FIG. 3 is a block diagram of an exemplary embodiment of a system 3000.

FIG. 3 is a block diagram of an exemplary embodiment of a system 3000, which can comprise a backbone network 3100, a first access network 3200, a second access network 3300, a first information device 3400, a second information device 3500, a local DNS 3600, an DNS based redirection system 3700, a first content distribution node 3800, and a second content distribution node 3850, a first router 3900, a second router 3910, a third router 3920, a fourth router 3930, a fifth router 3940, and a sixth router 3950. Note, heavy dashed lines in system 3000 represent session communications, heavy solid lines represent physical and/or logical communications links, and light lines with arrow tips represent an exchange of information between connected entities. In certain exemplary embodiments, each of first content distribution node 3800 and second content distribution node 3850 can be reached by a common anycast IP address. One or more of first router 3900, second router 3910, third router 3920, fourth router 3930, fifth router 3940, and sixth router 3950 can be adapted to automatically select a content distribution node based upon one or more predetermined criteria. The predetermined criteria can be related to physical proximity of the content distribution node to a requesting information device, a logical proximity of the content distribution node to a requesting information device, and/or load conditions in the network. Responsive to a request for content by first information device 3400 and/or second information device 3500, signals can be sent to local DNS 3600 requesting an address associated with the content. Local DNS 3600 can request that DNS based redirection system 3700 provide the address. The address can be an anycast IP address shared by first content distribution node 3800 and second content distribution node 3850.

Figure 4:
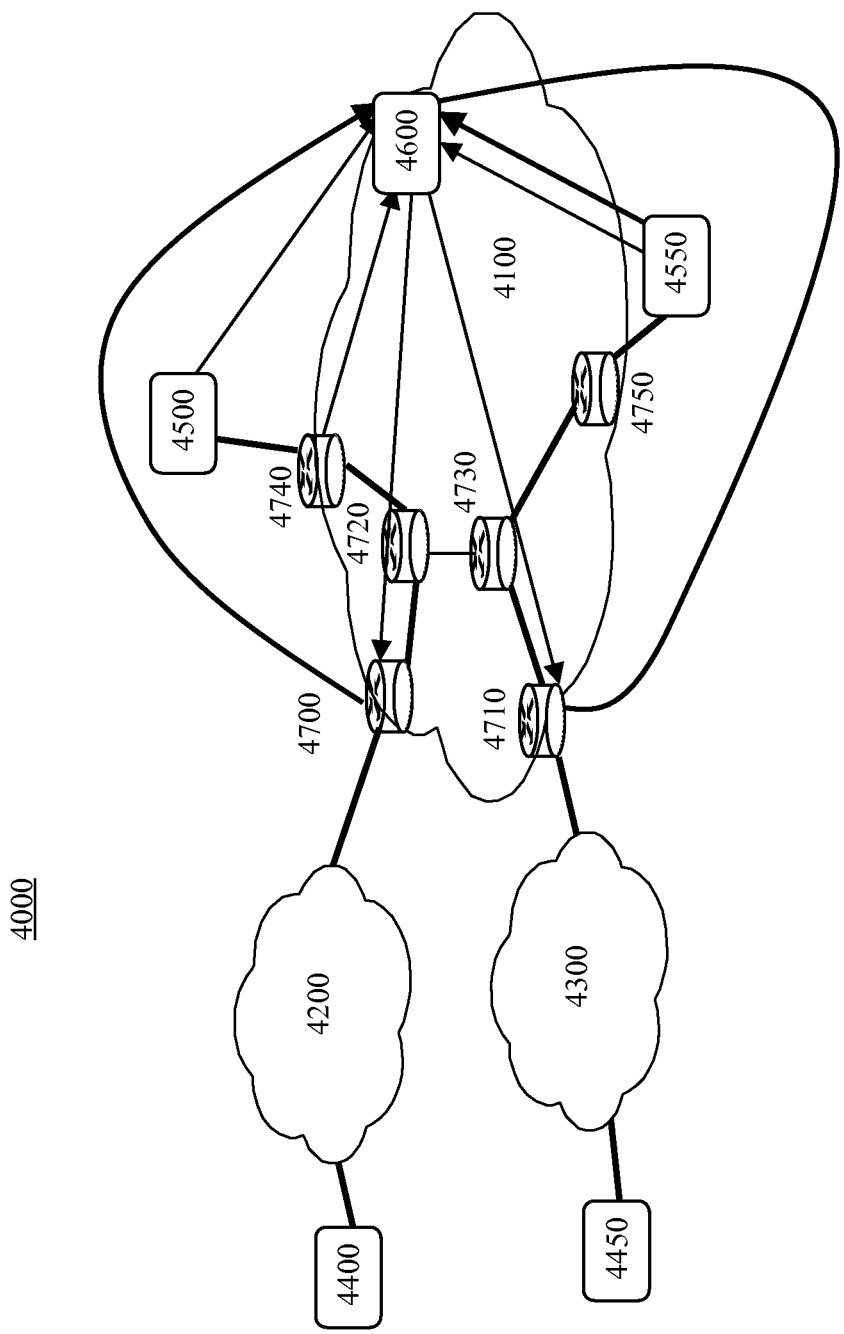
FIG. 4 is a block diagram of an exemplary embodiment of a system 4000.

FIG. 4 is a block diagram of an exemplary embodiment of a system 4000, which can comprise a backbone network 4100, a first access network 4200, a second access network 4300, a first information device 4400, a second information device 4450, a first content distribution node 4500, and a second content distribution node 4550, a first router 4700, a second router 4710, a third router 4720, a fourth router 4730, a fifth router 4740, a sixth router 4750, and an IRSCP 4600. Note, heavy solid lines represent physical and/or logical communications links and light lines with arrow tips represent an exchange of information between connected entities. IRSCP 4600 can be adapted to monitor one or more of backbone network 4100, first access network 4200, and/or second access network 4300 regarding component failures and/or load conditions (e.g., actual load on nodes, requests for network bandwidth, physical network distances, and/or logical network distances, etc.). IRSCP 4600 can be adapted to run a load balancing algorithm, which can be adapted to attempt to produce a ranked table of information devices and/or links that is ranked relative to load on each respective node and/or link. IRSCP 4600 can be adapted to change of the routing of packets exchanged between first information device 4400 and/or second information device 4450 and first content distribution node 4500 and/or a second content distribution node 4550. The routing can be changed responsive to one or more detected conditions associated with system 4000.

IRSCP 4600 can be adapted to provide a ranked list of provider edge routers, such as first router 4700 and second router 4710. As used herein, Provider Edge router means a router in a Provider network communicatively coupled to a device in a Customer network. The ranked list of provider edge routers can be ranked according to load. IRSCP 4600 can be adapted to provide information to one or more DNS based redirection system and/or local DNS devices adapted to change packet routing between first information device 4400 and/or second information device 4450 and first content distribution node 4500 and/or a second content distribution node 4550. IRSCP 4600 can be adapted to provide information to first router 4700, second router 4710, third router 4720, fourth router 4730, fifth router 4740, and/or sixth router 4750 adapted to change packet routing between first information device 4400 and/or second information device 4450 and first content distribution node 4500 and/or a second content distribution node 4550.

Figure 5:
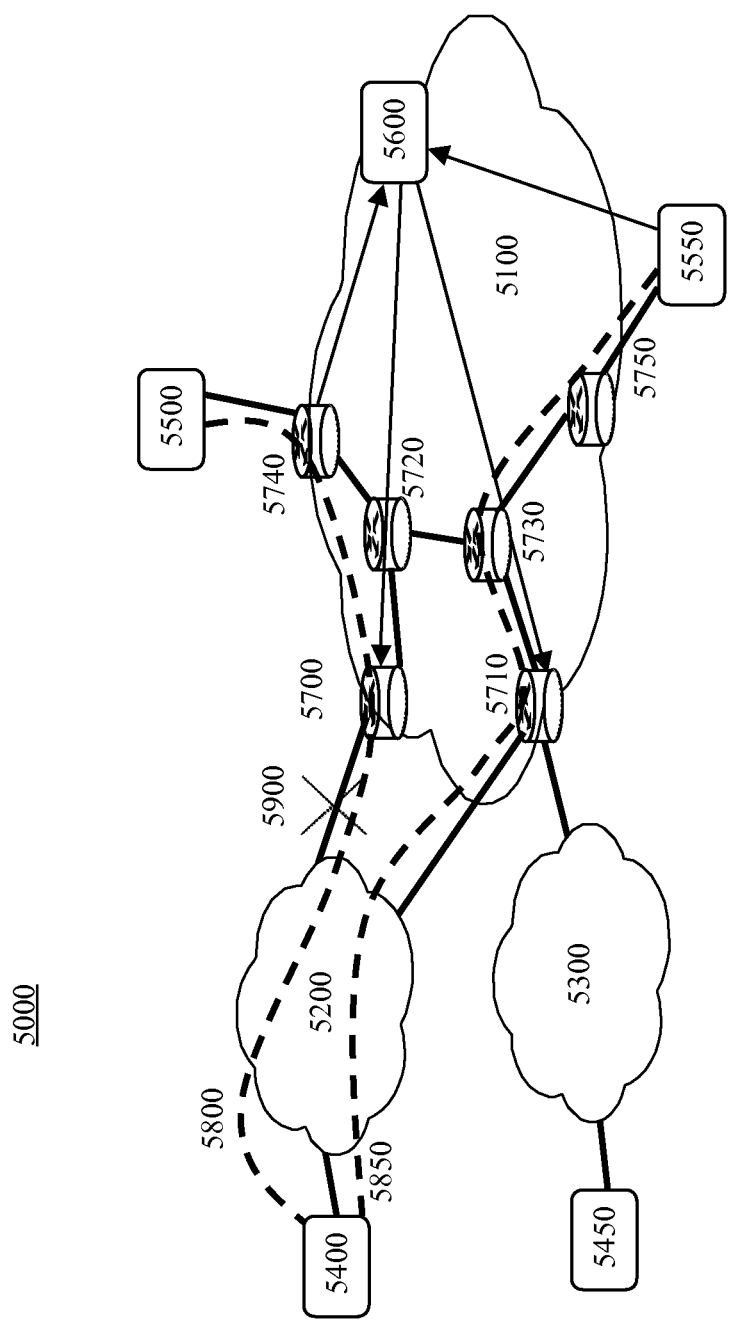
FIG. 5 is a block diagram of an exemplary embodiment of a system 5000.

FIG. 5 is a block diagram of an exemplary embodiment of a system 5000, which can comprise a backbone network 5100, a first access network 5200, a second access network 5300, a first information device 5400, a second information device 5450, a first content distribution node 5500, and a second content distribution node 5550, a first router 5700, a second router 5710, a third router 5720, a fourth router 5730, a fifth router 5740, a sixth router 5750, and an IRSCP 5600. Note, heavy dashed lines in system 5000 represent session communications, heavy solid lines represent physical and/or logical communications links, and light lines with arrow tips represent an exchange of information between connected entities. In certain exemplary embodiments, content requested by first information device 5400 and/or second information device 5450 can exceed a predetermined size and/or can be associated with an information transfer that exceeds a predetermined duration. Such content can be classified as long-lived content. Load balancing and/or certain network failures can be problematic for long-lived content transmissions since a change in a content distribution node during such a long-lived transmission might reset the long-lived transmission and cause the long-lived transmission to be retransmitted from a beginning packet. As used herein, begin means to start. For example, in exemplary a long-lived content transmission 5800 can be provided to first information device 5400 from first content distribution node 5500. First content distribution node 5500 might have been selected to provide long-lived content transmission 5800 to first information device 5400 by first router 5700 based upon information provided by IRSCP 5600.

In embodiments wherein first information device 5400 is provided an anycast IP address of first content distribution node 5500 and second content distribution node 5550, a failure 5900 of a link between first router 5700 and first access network 5200 can cause long-lived content transmission 5800 to terminate. As used herein, wherein means in regard to which; and; and/or in addition to. First information device 5400 can request long-lived content transmission 5800 be provided via second router 5710. Based upon information obtained from IRSCP 5500, second router 5710 can be adapted to communicatively couple first information device 5400 to second content distribution node 5550 rather than first content distribution node 5500. Such a coupling can cause long-lived content transmission 5800 to reset and a new long-lived content transmission 5850 to begin from a first packet of new long-lived content transmission 5850.

Figure 6:
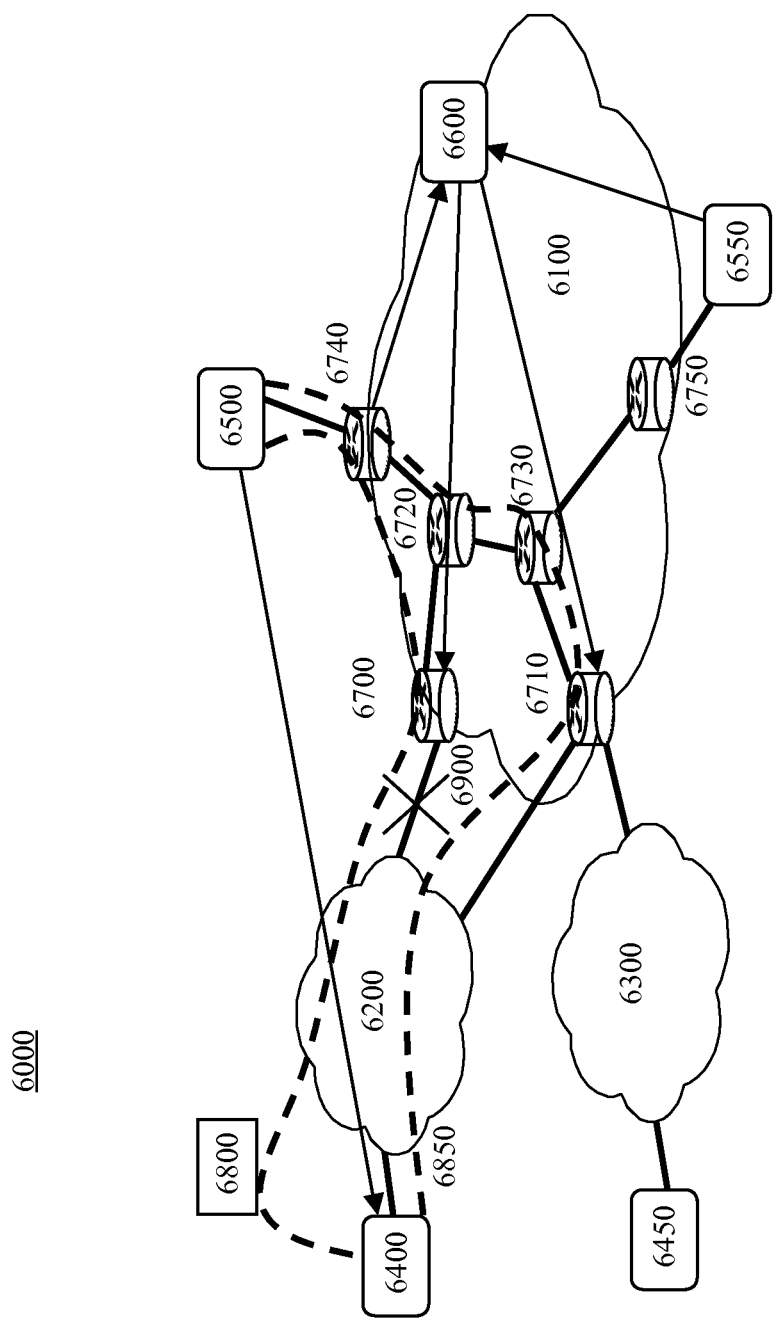
FIG. 6 is a block diagram of an exemplary embodiment of a system 6000.

FIG. 6 is a block diagram of an exemplary embodiment of a system 6000, which can comprise a backbone network 6100, a first access network 6200, a second access network 6300, a first information device 6400, a second information device 6450, a first content distribution node 6500, and a second content distribution node 6550, a first router 6700, a second router 6710, a third router 6720, a fourth router 6730, a fifth router 6740, a sixth router 6750, and an IRSCP 6600. Note, heavy dashed lines in system 6000 represent session communications, heavy solid lines represent physical and/or logical communications links, and light lines with arrow tips represent an exchange of information between connected entities. In certain exemplary embodiments, content requested by first information device 6400 and/or second information device 6450 can be determined to be long-lived content. An exemplary long-lived content transmission 6800 can be provided to first information device 6400 from first content distribution node 6500. First content distribution node 6500 might have been selected to provide long-lived content transmission 6800 to first information device 6400 by first router 6700 based upon information provided by IRSCP 6600.

In certain exemplary embodiments, first information device 6400 can be provided with an anycast IP address of first content distribution node 6500 and second content distribution node 6550 responsive to a request for long-lived content transmission 6800. In certain exemplary embodiments, first content distribution node 6500 can automatically detect that long-lived content transmission 6800 is long-lived content. Responsive to a determination that long-lived content transmission 6800 is long-lived content, first content distribution node 6500 can be adapted to provide a unicast IP address, unique to first content distribution node 6500, to first information device 6400. Information device 6400 can be adapted to use the unicast IP address for remaining communications associated with long-lived content transmission 6800. A failure 6900 of a link between first router 6700 and first access network 6200 can cause long-lived content transmission 6800 to be temporarily interrupted. Responsive to failure 6900 and/or load balancing performed by IRSCP 6600, first information device 6400 can request long-lived content transmission 6800 be provided via second router 6710. Based upon the unicast IP address, second router 6710 can be adapted to communicatively couple first information device 6400 to first content distribution node 6500 to continue transmission of the long-lived content via continued long-lived content transmission 6850. Such a coupling might not cause long-lived content transmission 6800 to reset and continued long-lived content transmission 6850 can be adapted to provide the long-lived content to first information device 6400 without a session reset. As used herein, session means an active communication between devices and/or applications over a network.

Via a selected PE router of a plurality of PE routers, the anycast IP address can be adapted to be used to communicatively couple the information device to a selected content distribution node of the plurality of content distribution nodes. Responsive to a determination that the content is associated with a long-lived session of a potential plurality of long-lived sessions, the selected content distribution node can be adapted to provide the information device with a unique unicast IP address of the selected content distribution node. As used herein, long-lived session means an active communication between devices and/or applications over a network having a duration that exceeds a predetermined time period, such as, for example a communication that comprises a streaming video. The information device can be adapted to utilize the unique unicast IP address in communications with the selected content distribution node regarding only long-lived sessions of a potential plurality of long-lived sessions.

Figure 9:
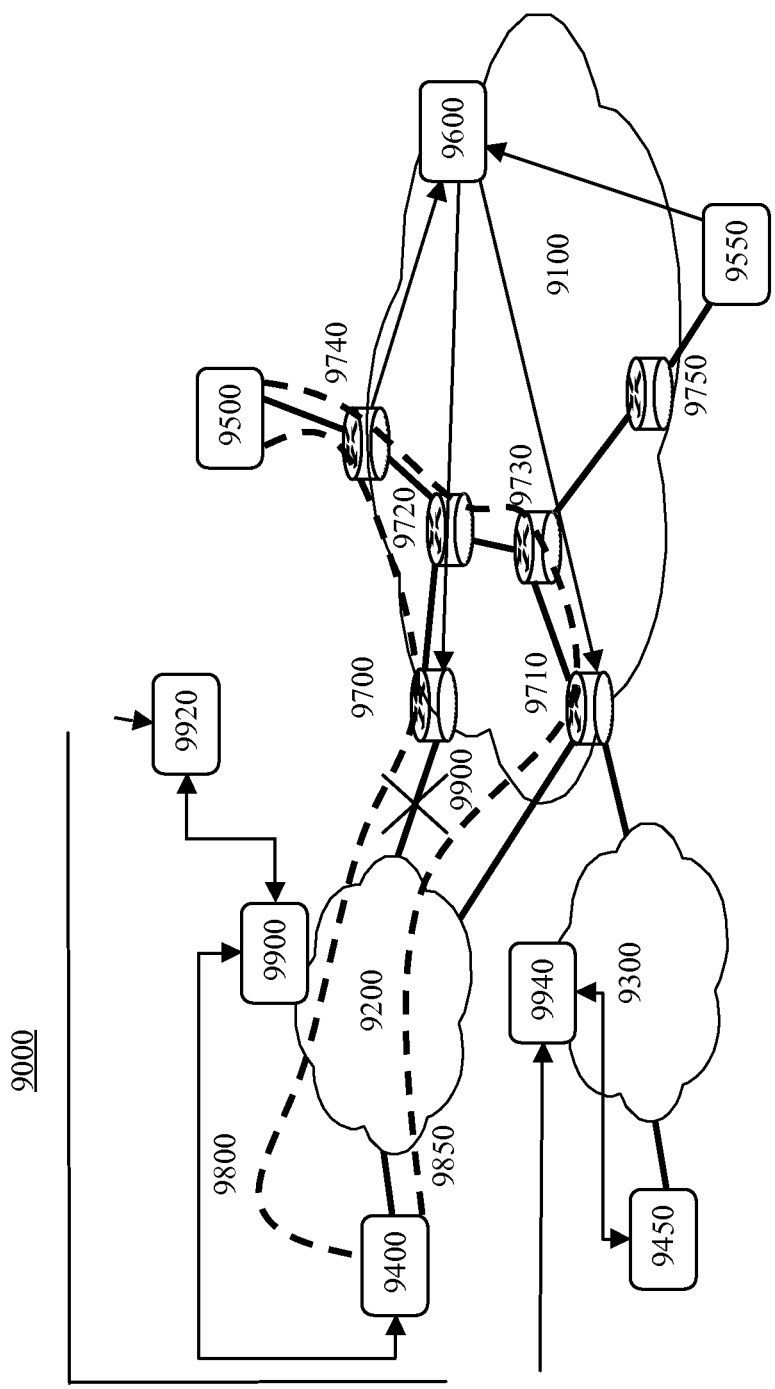
FIG. 9 is a block diagram of an exemplary embodiment of a system 9000.

FIG. 9 is a block diagram of an exemplary embodiment of a system 9000, which can comprise a backbone network 9100, a first access network 9200, a second access network 9300, a first information device 9400, a second information device 9450, a first content distribution node 9500, and a second content distribution node 9550, a first router 9700, a second router 9710, a third router 9720, a fourth router 9730, a fifth router 9740, a sixth router 9750, an IRSCP 9600, a first DNS server 9900, a second DNS server 9940, and a DNS based redirection system 9920. Note, heavy dashed lines in system 9000 represent session communications, heavy solid lines represent physical and/or logical communications links, and light lines with arrow tips represent an exchange of information between connected entities.

In certain exemplary embodiments, Domain Name System (DNS) based redirection system 9920 can be directly coupled to backbone network 9100. DNS based redirection system 9920 can be adapted to provide an anycast IP address to a DNS server, such as first DNS server 9900 and/or second DNS server 9940, responsive to a domain portion of a Uniform Resource Locator (URL) received by the DNS server from an information device, such as first information device 9400 and/or second information device 9450. The domain name portion of the URL can be indicative of a request by the information device for content. The anycast IP address can be assigned to a plurality of content distribution nodes, such as first content distribution node 9500 and second content distribution node 9550. Each of the plurality of content distribution nodes can be assigned a unique unicast IP address. Each of the plurality of content distribution nodes can be addressable by the anycast IP address or the unique unicast IP address, via a selected PE router of a plurality of PE routers, such as first router 9700 and second router 9710. The anycast IP address adapted to be used to communicatively couple the information device to a selected content distribution node of the plurality of content distribution nodes, responsive to a determination that the content is associated with a long-lived session of a potential plurality of long-lived sessions. The selected content distribution node can be adapted to provide the information device with the unique unicast IP address of the selected content distribution node. The information device can be adapted to utilize the unique unicast IP address in communications with the selected content distribution node regarding only long-lived sessions of the potential plurality of long-lived sessions.

In certain exemplary embodiments, content requested by first information device 9400 and/or second information device 9450 can be determined to be long-lived content. An exemplary long-lived content transmission 9800 can be provided to first information device 9400 from first content distribution node 9500. First content distribution node 9500 might have been selected to provide long-lived content transmission 9800 to first information device 9400 by first router 9700 based upon information provided by IRSCP 9600. IRSCP 9600 can be directly coupled to backbone network 9100. IRSCP 9600 can be adapted to automatically detect traffic loads in a network, such as first access network 9200, communicatively coupled to an information device, such as first information device 9400. IRSCP 9600 can be adapted to dynamically change preferred routes provided to the plurality of Provider Edge (PE) routers responsive to the traffic loads.

In certain exemplary embodiments, first information device 9400 can be provided with an anycast IP address of first content distribution node 9500 and second content distribution node 9550 responsive to a request for long-lived content transmission 9800. In certain exemplary embodiments, first content distribution node 9500 can automatically detect that long-lived content transmission 9800 is long-lived content. Responsive to a determination that long-lived content transmission 9800 is long-lived content, first content distribution node 9500 can be adapted to provide a unicast IP address, unique to first content distribution node 9500, to first information device 9400. Information device 9400 can be adapted to use the unicast IP address for remaining communications associated with long-lived content transmission 9800. A failure 9900 of a link between first router 9700 and first access network 9200 can cause long-lived content transmission 9800 to be temporarily interrupted. Responsive to failure 9900 and/or load balancing performed by IRSCP 9600, first information device 9400 can request long-lived content transmission 9800 be provided via second router 9710. Based upon the unicast IP address, second router 9710 can be adapted to communicatively couple first information device 9400 to first content distribution node 9500 to continue transmission of the long-lived content via continued long-lived content transmission 9850. Such a coupling might not cause long-lived content transmission 9800 to reset and continued long-lived content transmission 9850 can be adapted to provide the long-lived content to first information device 9400 without a session reset. As used herein, session means an active communication between devices and/or applications over a network.

Via a selected PE router of a plurality of PE routers, the anycast IP address can be adapted to be used to communicatively couple the information device to a selected content distribution node of the plurality of content distribution nodes. Responsive to a determination that the content is associated with a long-lived session of a potential plurality of long-lived sessions, the selected content distribution node can be adapted to provide the information device with a unique unicast IP address of the selected content distribution node. As used herein, long-lived session means an active communication between devices and/or applications over a network having a duration that exceeds a predetermined time period, such as, for example a communication that comprises a streaming video. The information device can be adapted to utilize the unique unicast IP address in communications with the selected content distribution node regarding only long-lived sessions of a potential plurality of long-lived sessions.

Figure 7:
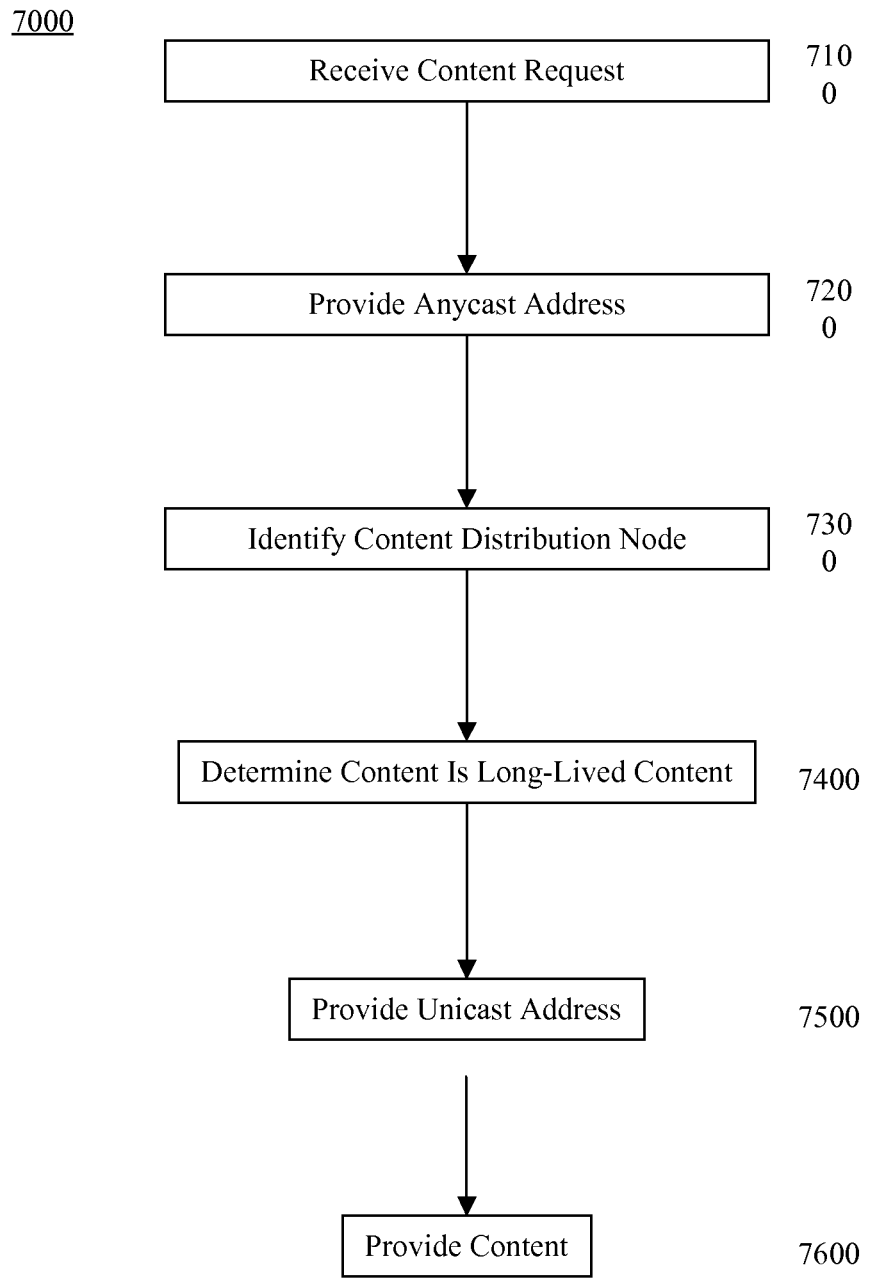
FIG. 7 is a flowchart of an exemplary embodiment of a method 7000.

FIG. 7 is a flowchart of an exemplary embodiment of a method 7000. As used herein, method means a process, procedure, and/or collection of related activities for accomplishing something. Any of the activities and/or subsets of the activities described herein associated with method 7000 can be performed automatically and/or implemented via machine-instructions stored in a machine-readable medium. In certain exemplary embodiments, instructions to implement any activity or subset of activities of method 7000 can be transmitted via a signal. As used herein, activity means an action, act, deed, function, step, and/or process and/or a portion thereof. As used herein, automatic means performed via an information device in a manner essentially independent of influence and/or control by a user. As used herein, automatically means acting and/or operating in a manner essentially independent of external human influence and/or control. For example, an automatic light switch can turn on upon "seeing" a person in its view, without the person manually operating the light switch. As used herein, machine instructions means directions adapted to cause a machine, such as an information device, to perform one or more particular activities, operations, and/or functions. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software.

As used herein, signal means information, such as machine instructions for activities and/or one or more letters, words, characters, symbols, signal flags, visual displays, and/or special sounds, etc. having prearranged meaning, encoded as automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc. Depending on the context, a signal and/or the information encoded therein can be synchronous, asynchronous, hard real-time, soft real-time, non-real time, continuously generated, continuously varying, analog, discretely generated, discretely varying, quantized, digital, broadcast, multicast, unicast, transmitted, conveyed, received, continuously measured, discretely measured, processed, encoded, encrypted, multiplexed, modulated, spread, de-spread, demodulated, detected, de-multiplexed, decrypted, and/or decoded, etc.

At activity 7100, a request for an address associated with content can be received from an information device. The information device can be adapted to, via a domain name portion of a Uniform Resource Locator (URL), send a message (i.e., a request for an address) to a DNS server. The DNS server can be adapted to provide an anycast IP address responsive to the message. The request for the address associated with content can be received at the DNS server, which can be adapted to request the address associated with the content from a DNS based redirection system directly coupled to a backbone network. The DNS based redirection system can be adapted to determine an anycast IP address of a plurality of content distribution servers responsive to the request. The DNS based redirection system can be adapted to provide the anycast IP address to the information device via the DNS server.

At activity 7200, the anycast IP address of the plurality of content distribution nodes can be provided to the requesting information device from the DNS based redirection system via the local DNS server. The anycast IP address can be shared by the plurality of content distribution nodes. The information device can be adapted to transmit a first request for content. The first request for content can comprise the anycast IP address. The first request for content can be received at a network router (e.g., a provider edge router).

At activity 7300, the network router can be adapted to utilize the anycast IP address to determine a logically nearest router to the information device. The router can effectively identify, based upon information obtained from an IRSCP, a first content distribution node, of a plurality of content distribution nodes. As used herein, logically means related to a sequential placement relative to other elements and/or identification of that sequential placement. As used herein, nearest means closest in proximity to. The first content distribution node can be determined to be a logically nearest content distribution node to the information device. An automatic determination that the first content distribution node is logically nearest to the information device can be made by a Provider Edge router based upon preferred routes assigned by the IRSCP. The preferred routes can be based upon automatically detected traffic loads in a network communicatively coupled to the information device. The IRSCP can be adapted to dynamically change the preferred routes. The network router can be adapted to communicatively couple the information device to the first content distribution node. Thereby, the network router can be adapted to automatically cause a communication session to be established between the information device and the first content distribution node.

At activity 7400, a determination can be made that the content is long-lived content. The determination can be based upon a determination that a size of the long-lived content exceeds a predetermined threshold. The predetermined threshold can be, in megabytes, 25, 75.8, 81.4, 199, 250, 743.9, 891, 928.6, 2145, 4487.5, 6000, 24327.6, 45849, 78394.7, 140239.6, 250000, 1000000, and/or any value or subrange there between. The determination can be based upon a determination that a duration of transmission of the long-lived content exceeds a predetermined duration. The predetermined duration can be, in minutes, 0.1, 1, 4.5, 5.8, 8, 10.4, 25, 48.9, 79.9, 113.45, 455, 627.4, 1204.5, 1508, 7409, 9915.3, 15000, and/or any value or subrange there between. In certain exemplary embodiments, content that is not long-lived content can be assigned a different anycast address from long-lived content and the determination that the content is long-lived can be based upon the anycast address.

At activity 7500, a unicast IP address of the first content distribution node can be automatically provided (i.e., application level redirection can be provided) to the requesting information device responsive to the determination that the content is long-lived content. The information device can be adapted to provide the first content distribution node with a second request for the content that comprises the unicast IP address. The content distribution node can be addressable by either the anycast IP address or the unicast IP address.

Application layer redirection can function as follows. First, end-users can request streaming content, such as by selecting a uniform resource locator (URL) on a Web page hosted by the publishing platform using the anycast IP address. In certain exemplary embodiments, a Web object can be a streaming meta-file (e.g. an ASX file) which can comprise the streaming URL. In certain exemplary embodiments, the meta-file might contain the unicast IP address associated with the CDN node. The redirection server can be contacted to obtain the actual streaming URL.

At activity 7600, the content can be provided to and/or received at the requesting information device from the first content distribution node. The content can be automatically provided from a cache comprised by the first content distribution node. If the first content distribution node does not have the content in a memory device directly coupled thereto, the first content distribution node can be adapted to automatically request the content from a content provider.

Figure 8:
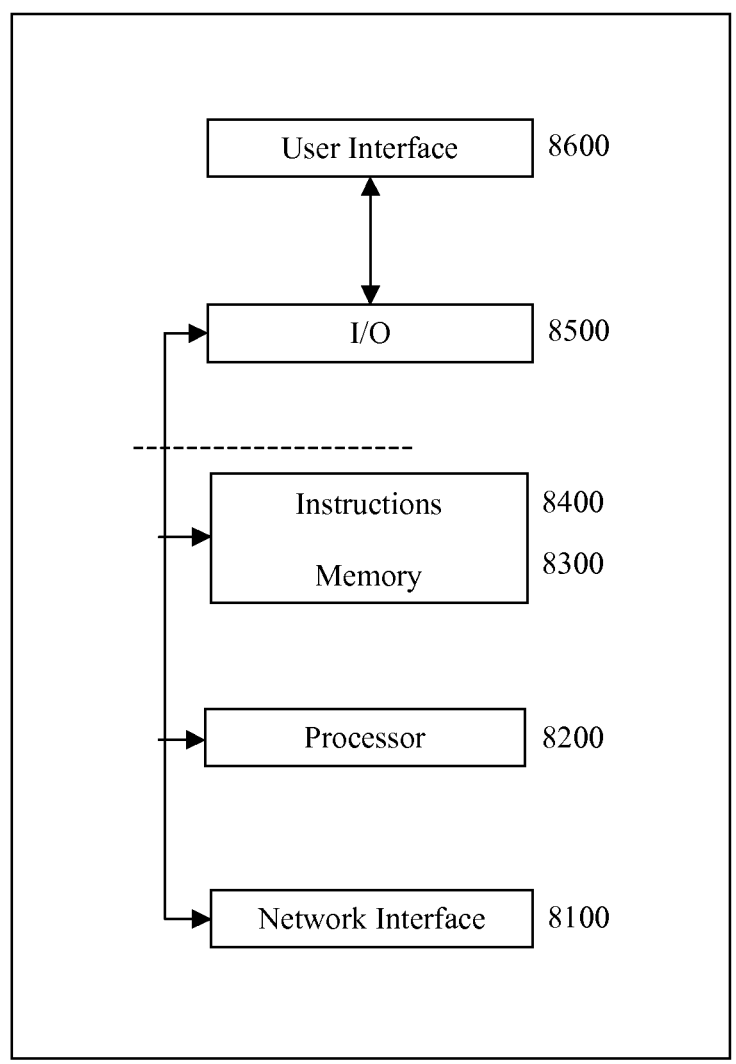
FIG. 8 is a block diagram of an exemplary embodiment of an information device 8000.

FIG. 8 is a block diagram of an exemplary embodiment of an information device 8000, which in certain operative embodiments can comprise, for example, first information device 1400 and second information device 1450 of FIG. 1. Information device 8000 can comprise any of numerous components, such as for example, one or more network interfaces 8100, one or more processors 8200, one or more memories 8300 containing instructions 8400, one or more input/output (I/O) devices 8500, and/or one or more user interfaces 8600 coupled to I/O device 8500, etc.

In certain exemplary embodiments, via one or more user interfaces 8600, such as a graphical user interface, a user can view a rendering of information related to researching, designing, modeling, creating, developing, building, manufacturing, operating, maintaining, storing, marketing, selling, delivering, selecting, specifying, requesting, ordering, receiving, returning, rating, and/or recommending any of the products, services, methods, and/or information described herein.

As used herein, information device means any device on which resides a finite state machine capable of implementing at least a portion of a method, structure, and/or or graphical user interface described herein. An information device can comprise well-known communicatively coupled components, such as one or more network interfaces, one or more processors, one or more memories containing instructions, one or more input/output (I/O) devices, and/or one or more user interfaces (e.g., coupled to an I/O device) via which information can be rendered to implement one or more functions described herein. For example, an information device can be any general purpose and/or special purpose computer, such as a personal computer, video game system (e.g., PlayStation, Nintendo Gameboy, X-Box, etc.), workstation, server, minicomputer, mainframe, supercomputer, computer terminal, laptop, wearable computer, and/or Personal Digital Assistant (PDA), iPod, mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, a digital signal processor, an ASIC or other integrated circuit, a hardware electronic logic circuit such as a discrete element circuit, and/or a programmable logic device such as a PLD, PLA, FPGA, or PAL, or the like, etc.

As used herein, processor means a hardware, firmware, and/or software machine and/or virtual machine comprising a set of machine-readable instructions adaptable to perform a specific task. A processor can utilize mechanical, pneumatic, hydraulic, electrical, magnetic, optical, informational, chemical, and/or biological principles, mechanisms, signals, and/or inputs to perform the task(s). In certain embodiments, a processor can act upon information by manipulating, analyzing, modifying, and/or converting it, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein. A processor can reside on and use the capabilities of a controller.

As used herein, input/output (I/O) device means any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

As used herein, machine-readable medium means a physical structure from which a machine, such as an information device, computer, microprocessor, and/or controller, etc., can obtain and/or store data, information, and/or instructions. Examples include memories, punch cards, and/or optically readable forms, etc. As used herein, memory device means an apparatus capable of storing analog or digital information, such as instructions and/or data. Examples include a nonvolatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

As used herein, user interface means a device and/or software program for rendering information to a user and/or requesting information from the user. A user interface can include at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc. As used herein, said means when used in a system or device claim, an article indicating a subsequent claim term that has been previously introduced.

As used herein, render means to display, annunciate, speak, print, and/or otherwise make perceptible to a human, for example as data, commands, text, graphics, audio, video, animation, and/or hyperlinks, etc., such as via any visual, audio, and/or haptic means, such as via a display, monitor, printer, electric paper, ocular implant, cochlear implant, speaker, etc.

As used herein, obtain means to receive, get, take possession of, procure, acquire, calculate, determine, and/or compute. As used herein, receive means to gather, take, acquire, obtain, accept, get, and/or have bestowed upon. As used herein, adapted to means suitable, fit, and/or capable of performing a specified function. As used herein, perform means to begin, take action, do, fulfill, accomplish, carry out, and/or complete, such as in accordance with one or more criterion. As used herein, information means facts, terms, concepts, phrases, expressions, commands, numbers, characters, and/or symbols, etc., that are related to a subject. Sometimes used synonymously with data, and sometimes used to describe organized, transformed, and/or processed data. It is generally possible to automate certain activities involving the management, organization, storage, transformation, communication, and/or presentation of information.

As used herein, only means substantially without anything further. As used herein, substantially means to a considerable, large, and/or great, but not necessarily whole and/or entire, extent and/or degree. As used herein, otherwise means in other respects. As used herein, thereby means because of. As used herein, allow means to provide, let do, happen, and/or permit. As used herein, cost means a quantitative and/or qualitative measure of time and/or resources associated with an activity. As used herein, fail means to cease proper functioning and/or performance. As used herein, all means every one of a set. As used herein, comprised by means included by. As used herein, Domain Name System (DNS) server means a device and/or system adapted to associate at least a portion of a domain name and/or Uniform Resource Locator address with an Internet Protocol address and adapted to provide the Internet Protocol address to requesting information devices.

As used herein, address means (n.) one or more identifiers, such as one or more symbols, characters, names, and/or numbers, used for identification in information transmission, storage, and/or retrieval, the one or more identifiers assignable to a specific physical, logical, and/or virtual machine, process, node, object, entity, record, data element, component, port, interface, location, link, route, circuit, and/or network; (v.) to locate, access, assign, and/or provide an identifier a specific physical, logical, and/or virtual machine, process, node, object, entity, record, data element, component, port, interface, location, link, route, circuit, and/or network. As used herein, circuit means an electrically conductive pathway and/or a communications connection established across two or more switching devices comprised by a network and between corresponding end systems connected to, but not comprised by the network. As used herein, dynamically means on demand or as necessary. As used herein, entity means something that exists as a particular and discrete unit.

As used herein, detect means to sense, perceive, identify, discover, ascertain, respond to, and/or receive the existence, presence, and/or fact of. As used herein, regarding means pertaining to. As used herein, change means (v.) to cause to be different; (n.) the act, process, and/or result of altering or modifying. As used herein, assign means to designate, appoint, allot, and/or attribute, and/or to select and set apart for a particular purpose. As used herein, Uniform Resource Locator (URL) means an address that specifies a location of a file. As used herein, directly means without anything intervening. As used herein, first means an initial element of a series. As used herein, if means in case that. As used herein, second means an element that immediately follows an initial element of a series. As used herein, request means (v.) to express a need and/or desire for; to inquire and/or ask for. (n.) that which communicates an expression of desire and/or that which is asked for. As used herein, communications link means an established communication channel. As used herein, based means being derived from. As used herein, based upon means determined in consideration of and/or derived from. As used herein, determine means to obtain, calculate, decide, deduce, establish, and/or ascertain. As used herein, establish means to create, form, and/or set-up.

As used herein, redirect means to change the direction and/or route of. As used herein, route means (n) a path along which information, such as packets, can be sent; (v) to select a network path for a message. As used herein, system means a collection of mechanisms, devices, data, and/or instructions, the collection designed to perform one or more specific functions. As used herein, unicast means a communication via a network between a single sender and a single receiver. As used herein, communication means a transmission and/or exchange of information. As used herein, store means to place, hold, retain, enter, and/or copy into and/or onto a machine-readable medium. As used herein, communicatively means linking in a manner that facilitates communications. As used herein, communicatively couple means to link in a manner that facilitates communications. As used herein, couple means to join, connect, and/or link two things together. As used herein, cache means a memory where frequently accessed data can be stored for relatively rapid access. As used herein, local area network (LAN) means a data communications network that is geographically limited (typically to a 1 km radius). As used herein, each means every one of a group considered individually.

As used herein, domain means a group of computers and/or devices on a communications network that are administered as a unit with at least some common rules and/or procedures and share at least a portion of a common name and/or communications address. As used herein, approximately means about and/or nearly the same as. As used herein, located means situated in a particular spot and/or position. As used herein, interface means (n) an addressable device for communicatively coupling an entity (such as a router, server, switch, softswitch, gateway, etc.) to a packet network, the addressable device comprising hardware, firmware, and/or software, etc. The entity can have multiple interfaces, each of which can be addressable via one or more packet networks. (v) to connect with and/or interact with by way of an interface. As used herein, comprise means to include but not be limited to. As used herein, potential means existing in possibility. As used herein, occur means to take place.

As used herein, more means greater in size, amount, extent, and/or degree. As used herein, Internet Protocol (IP) means a network protocol that specifies the format of packets, also called datagrams, and the addressing scheme for the packets. By itself, IP is a protocol for providing a message from a source to a network, but does not establish a direct link between the source and the destination. As used herein, message means a communication. TCP/IP, on the other hand, can establish a connection between two communicators so that they can send messages back and forth for a period of time. As used herein, backbone network means a "transit" network, often made up of long-distance telephone trunk lines and/or other wired and/or wireless links such as microwave and satellite links, adapted for transmitting large amounts of data simultaneously between host computer systems connected to the Internet. As used herein, between means in a separating interval and/or intermediate to. As used herein, data means information represented in a form suitable for processing by an information device. As used herein, device means a machine, manufacture, and/or collection thereof.

Definitions

When terms are used substantively herein for which explicit definitions have been provided, these definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition. As used herein, link means a physical and/or logical communication channel between a pair of switching and/or routing devices; and/or an activatable connection to another web page, location in a web page, file, and/or other Internet resource.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, abstract, drawing figure, etc.) of this application, unless clearly specified to the contrary, such as via an explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

any elements can be integrated, segregated, and/or duplicated;

any activity can be repeated, performed by multiple entities, and/or performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values between, such as for example, 1.1, 2.5, 3.335, 5, 6.179, 8.9999, etc., and includes all subranges there between, such as for example, 1 to 3.65, 2.8 to 8.14, 1.93 to 9, etc.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

Accordingly, every portion (e.g., title, field, background, summary, abstract, drawing figure, etc.) of this application, other than the claims themselves, is to be regarded as illustrative in nature, and not as restrictive.

What is claimed is:

1. A system comprising: a memory that stores instructions:
    a processor that executes the instructions to perform operations, the operations comprising:
    receiving, from a device, a first request for an address associated with content;
providing, in response to the first request, an anycast internet protocol address of a plurality of content distribution nodes:
    selecting, based on the anycast internet protocol address, a first content distribution node of the plurality of content distribution nodes based on the first content distribution node being physically nearest to the device and based on a logical proximity of the first content distribution node to the device;
    determining whether the content is long-lived content based upon the anycast internet protocol address being a first anycast internet protocol address that is associated with the long-lived content rather than a second anycast internet protocol address that is associated with short-lived content;
    providing, to the device, an unicast internet protocol address of the first content distribution node when the content is determined to be the long-lived content wherein the unicast internet protocol address is only utilized for long-lived sessions associated with the long-lived content, wherein the unicast internet protocol address is provided via an application level redirection that involves obtaining the unicast internet protocol address from a meta-file;
    receiving a second request for the content, wherein the second request comprises the unicast internet protocol address;
    providing, in response to the second request, the content to the device, wherein, if a failure occurs with a first router while providing the content to the device during a first transmission with the first content distribution node, a second router couples the device to the first content distribution node to continue providing the content to the device via a second transmission without requiring a session reset of the first transmission, wherein the second router couples the device to the first content distribution node based on the unicast internet protocol address included in the second request; and
    adjusting routing of packets of the content to the device in accordance with a ranked table of links and information devices, wherein the links and information devices are ranked relative to a load on each respective link and information device in the ranked table, wherein the ranked table of links and information devices is generated based on a load balancing algorithm.

2. The system of claim 1, wherein the operations further comprise determining whether the content is long-lived content based upon a determination that a size of the content exceeds a threshold.

3. The system of claim 1, wherein the operations further comprise determining whether the content is long-lived content based upon a determination that a duration of transmission of the content exceeds a predetermined duration.

4. The system of claim 1, wherein the operations further comprise identifying, based on a preferred route assigned by an intelligent route service control point, the first content distribution node of the plurality of content distribution nodes that is nearest to the device.

5. The system of claim 1, wherein the operations further comprise obtaining the content from a content provider if the first content distribution node does not have the content.

6. The system of claim 1, wherein the operations further comprise requesting, if the first content distribution node fails, the content from a second content distribution node of the plurality of content distribution nodes by utilizing the anycast internet protocol address.

7. The system of claim 1, wherein the operations further comprise determining that the content is associated with a long-lived session associated with a plurality of long-lived sessions.

8. The system of claim 7, wherein the operations further comprise determining that the content is associated with the long-lived session if the session has a duration that exceeds a predetermined time period.

9. The system of claim 1, wherein the operations further comprise assigning the first anycast internet protocol address to the long-lived content and the second anycast internet protocol address to the short-lived content.

10. A method comprising:
    receiving, from a device, a first request for an address associated with content;
providing, in response to the first request, an anycast internet protocol address of a plurality of content distribution nodes;
    selecting, based on the anycast internet protocol address, a first content distribution node of the plurality of content distribution nodes based on the first content distribution node being physically nearest to the device and based on a logical proximity of the first content distribution node to the device;

determining, by utilizing instructions from memory that are executed by a processor, whether the content is long-lived content based upon the anycast internet protocol address being a first anycast internet protocol address that is associated with the long-lived content rather than a second anycast internet protocol address that is associated with short-lived content;

providing, to the device, an unicast internet protocol address of the first content distribution node when the content is determined to be the long-lived content, wherein the unicast internet protocol address is only utilized for long-lived sessions associated with the long-lived content, wherein the unicast internet protocol address is provided via an application level redirection that involves obtaining the unicast internet protocol address from a meta-file;

receiving a second request for the content, wherein the second request comprises the unicast internet protocol address;

providing, in response to the second request, the content to the device, wherein, if a failure occurs with a first router while providing the content to the device during a first transmission with the first content distribution node, a second router couples the device to the first content distribution node to continue providing the content to the device via a second transmission without requiring a session reset of the first transmission, wherein the second router couples the device to the first content distribution node based on the unicast internet protocol address included in the second request; and adjusting routing of packets of the content to the device in accordance with a ranked table of links and information devices, wherein the links and information devices are ranked relative to a load on each respective link and information device in the ranked table, wherein the ranked table of links and information devices is generated based on a load balancing algorithm.

11. The method of claim 10, further comprising determining whether the content is long-lived content based upon a determination that a size of the content exceeds a threshold.

12. The method of claim 10, further comprising determining whether the content is long-lived content based upon a determination that a duration of transmission of the content exceeds a predetermined duration.

13. The method of claim 10, further comprising identifying, based on a preferred route assigned by an intelligent route service control point, the first content distribution node of the plurality of content distribution nodes that is nearest to the device.

14. The method of claim 10, further comprising obtaining the content from a content provider if the first content distribution node does not have the content.

15. The method of claim 10, further comprising requesting, if the first content distribution node fails, the content from a second content distribution node of the plurality of content distribution nodes by utilizing the anycast internet protocol address.

16. The method of claim 10, further comprising determining that the content is associated with a long-lived session associated with a plurality of sessions.

17. The method of claim 16, further comprising determining that the content is associated with the long-lived session if the session has a duration that exceeds a predetermined time period.

18. The method of claim 10, further comprising assigning the first anycast internet protocol address to the long-lived content and the second anycast internet protocol address to the short-lived content.

19. A non-transitory machine-readable device comprising instructions, which, when loaded and executed by a processor, cause the processor the perform operations, the operations comprising:

receiving, from a device, a first request for an address associated with content;

providing, in response to the first request, an anycast internet protocol address of a plurality of content distribution nodes;

selecting, based on the anycast internet protocol address, a first content distribution node of the plurality of content distribution nodes based on the first content distribution node being physically nearest to the device and based on a logical proximity of the first content distribution node to the device;

determining whether the content is long-lived content based upon the anycast internet protocol address being a first anycast internet protocol address that is associated with the long-lived content rather than a second anycast internet protocol address that is associated with short-lived content;

providing, to the device, an unicast internet protocol address of the first content distribution node when the content is determined to be the long-lived content, wherein the unicast internet protocol address is only utilized for long-lived sessions associated with the long-lived content, wherein the unicast internet protocol address is provided via an application level redirection that involves obtaining the unicast internet protocol address from a meta-file;

receiving a second request for the content, wherein the second request comprises the unicast internet protocol address;

providing, in response to the second request, the content to the device, wherein, if a failure occurs with a first router while providing the content to the device during a first transmission with the first content distribution node, a second router couples the device to the first content distribution node to continue providing the content to the device via a second transmission without requiring a session reset of the first transmission, wherein the second router couples the device to the first content distribution node based on the unicast internet protocol address included in the second request; and adjusting routing of packets of the content to the device in accordance with a ranked table of links and information devices, wherein the links and information devices are ranked relative to a load on each respective link and information device in the ranked table, wherein the ranked table of links and information devices is generated based on a load balancing algorithm.

20. The machine-readable device of claim 19, further comprising requesting, if the first content distribution node fails, the content from a second content distribution node of the plurality of content distribution nodes by utilizing the anycast internet protocol address.

* * * * *